US009432066B2

(12) United States Patent
Gao

(10) Patent No.: US 9,432,066 B2
(45) Date of Patent: Aug. 30, 2016

(54) MULTI-CHANNEL COMMUNICATION TERMINAL

(71) Applicant: HONGKONG UCLOUDLINK NETWORK TECHNOLOGY LIMITED, Hong Kong (CN)

(72) Inventor: Wen Gao, Hong Kong (CN)

(73) Assignee: HONGKONG UCLOUDLINK NETWORK TECHNOLOGY LIMITED, Hong Kong (CN)

( * ) Notice: Subject to any disclaimer, the term of this patent is extended or adjusted under 35 U.S.C. 154(b) by 126 days.

(21) Appl. No.: 14/159,808

(22) Filed: Jan. 21, 2014

(65) Prior Publication Data
US 2015/0171909 A1 Jun. 18, 2015

(30) Foreign Application Priority Data

Dec. 13, 2013 (CN) .......................... 2013 1 0685038

(51) Int. Cl.
*H04B 1/3816* (2015.01)
*H04W 8/20* (2009.01)
*H04W 12/06* (2009.01)
*H04W 76/02* (2009.01)
*H04W 88/06* (2009.01)
*H04L 29/06* (2006.01)

(52) U.S. Cl.
CPC ........... *H04B 1/3816* (2013.01); *H04W 8/205* (2013.01); *H04W 12/06* (2013.01); *H04W 76/025* (2013.01); *H04L 63/18* (2013.01); *H04W 88/06* (2013.01)

(58) Field of Classification Search
USPC ................ 455/500, 550.1, 552.1, 553.1, 558
See application file for complete search history.

(56) References Cited

U.S. PATENT DOCUMENTS

| 6,138,002 | A | * | 10/2000 | Alperovich | ........... | H04M 15/28 455/407 |
| 2007/0004457 | A1 | * | 1/2007 | Han | ........................ | H04W 8/20 455/558 |
| 2008/0295159 | A1 | * | 11/2008 | Sentinelli | ................ | G06F 21/34 726/6 |
| 2012/0129513 | A1 | * | 5/2012 | van der Laak | ....... | H04W 4/001 455/419 |
| 2013/0065557 | A1 | * | 3/2013 | Zhang | ................... | H04W 12/06 455/411 |
| 2013/0316676 | A1 | * | 11/2013 | Nousiainen | ............. | H04W 8/18 455/411 |
| 2014/0194118 | A1 | * | 7/2014 | Liu | ....................... | H04W 36/18 455/435.1 |

* cited by examiner

*Primary Examiner* — Nguyen Vo
(74) *Attorney, Agent, or Firm* — Leason Ellis LLP

(57) ABSTRACT

A multi-channel communication terminal has at least two communication channels including a first communication channel and a second communication channel. The first communication channel is established by a first service provider system, and is configured to acquire subscriber identity information assigned by a remote server and provide service sharing. The second communication channel is established by a second service provider system according to the subscriber identity information, and is configured to acquire a service provided by the second service provider system. A subscriber acquires appropriate subscriber identity information according to actual requirements, and communicates with a corresponding service provider system according to the subscriber identity information to acquire a service provided by the service provider system, thereby acquiring an international, any-service provider, any-technology and mode, or any-service network access service.

4 Claims, 2 Drawing Sheets

MULTI-CHANNEL COMMUNICATION TERMINAL

CROSS-REFERENCE TO RELATED APPLICATIONS

This application claims priority to Chinese Patent Application No. 201310685038.2 filed on Dec. 13, 2013 before the Chinese Patent Office and entitled "MULTI-CHANNEL COMMUNICATION TERMINAL", which is incorporated herein by reference in its entirety.

FIELD OF THE INVENTION

Embodiments of the present invention relate to the field of communications technologies, and in particular, to a multi-channel communication terminal.

BACKGROUND OF THE INVENTION

At present, subscribers generally access corresponding service providers over different devices according to different communication modes. Such different devices comprise fixed network access device, 2G-based, 3G-based or 4G-based mobile communication network device, and Near Field Communication (NFC)-based, WiFi-based or Bluetooth-based short-range communication devices.

Almost all the communication terminals, such as mobile phones, data cards, and hotspot devices, are capable of establishing connections with the corresponding service providers or networks using physical Subscriber Identity Module (SIM) cards inserted thereon. In this way, one communication terminal is only capable of accessing a service provider or network corresponding to a current SIM card, and is only capable of using a voice or data service provided by the service provider or network.

SUMMARY OF THE INVENTION

Embodiments of the present invention provide a multi-channel communication terminal, which is capable of acquiring services provided by an appropriate service provider according to the location of a subscriber.

The embodiments of the present invention are implemented as follows:

A multi-channel communication terminal is provided, which supports at least two communication channels, i.e., a first communication channel and a second communication channel, wherein:

the first communication channel is established by a first service provider system, and configured to acquire subscriber identity information assigned by a remote server and providing service sharing; and the second communication channel is established by a second service provider system according to the subscriber identity information, and configured to acquire a service provided by the second service provider system.

According to the embodiments of the present invention, the communication terminal acquires appropriate subscriber identity information according to actual requirements, and communicates with a corresponding service provider system according to the subscriber identity information to acquire a service provided by the service provider system, thereby acquiring an international, any-network, any-service provider, any-technology and mode, or any-service network access service.

DETAILED DESCRIPTION OF THE INVENTION

To make the objective, technical solution, and advantages of the present invention more clear, the following section describes the technical solution of the present invention in combination with the accompanying drawings. It should be understood that the embodiments described here are only exemplary ones for illustrating the present invention, and are not intended to limit the present invention.

The multi-channel communication terminal supports at least two communication channels, communicates with a remote server to acquire subscriber identity information provided by the remote server for sharing, thereby implementing various international, any-service provider, any-communication mode services.

The multi-communication terminal according to an embodiment of the present invention supports at least two communication channels.

The first communication channel is established by a first service provider system, and configured to acquire subscriber identity information assigned by a remote server and providing service sharing.

In the embodiments of the present invention, the subscriber identity information is used for a service provider to authenticate a subscriber, wherein the subscriber identity information comprises SIM data of a subscriber serviced by a mobile service provider, password corresponding to an instant messaging identifier of an instant messaging subscriber, password of a WiFi subscriber, subscriber name and password of an xDSL subscriber.

The second communication channel is established by a second service provider system according to the subscriber identity information, and configured to acquire a service provided by the second service provider system.

Figure 1:
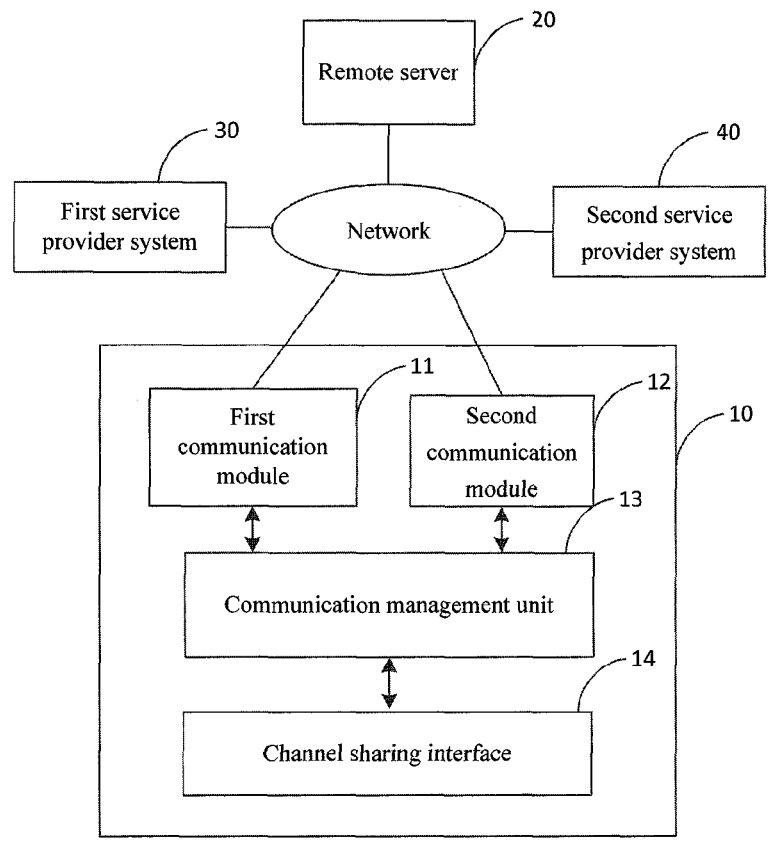
FIG. 1 is a schematic structural diagram of a multi-channel terminal according to an embodiment of the present invention.

FIG. 1 illustrates a structure of a multi-channel communication terminal according to an embodiment of the present invention. For ease of description, parts relevant to the embodiments of the present invention are only illustrated.

The multi-channel communication terminal 10 comprises a first communication module 11, a second communication module 12, and a communication management unit 13.

The communication management unit 13 dynamically loads, using the first communication module 11 and over a first communication channel established by a first service provider system 30, the subscriber identity information assigned by a remote server 20, and acquires, using the second communication module 12 and over a second communication channel established by a second service provider system 40, a service provided by the service provider system 40.

In an embodiment of the present invention, the first communication module 11 may communicate with the remote server 20 over a network, including a wide area network (Internet) or a local area network (Intranet).

In an embodiment of the present invention, the first communication module 11 comprises a modem, wherein the modem accesses the remote server 20 in such mobile communication modes as Global System for Mobile Communications (GSM), General Packet Radio Service (GPRS), Enhanced Data rates for GSM Evolution (EDGE), Code Division Multiple Access (CDMA), Enhanced Voice-Data Optimized (EVDO), Universal Mobile Telecommunications System (UMTS), Long Term Evolution (LTE), Wireless Fidelity (WiFi), or satellite communication, or accesses the remote server 20 over such fixed networks as an Asymmetric Digital Subscriber Line (ADSL) network and a cable network. A corresponding model may be selected according to a network access mode supported by the multi-channel communication terminal 10.

In a preferred embodiment of the present invention, the first communication module 11 supports one or a plurality of physical SIM cards, and the multi-channel communication terminal 10 may communicate, using the SIM card, with a corresponding service provider system to establish the first communication channel and access the remote server 20.

In this case, the first communication module 11 comprises at least one SIM card slot, and a SIM card read-and-write chip connected to the SIM card slot, wherein a SIM card of the subscriber may be inserted into the SIM card slot.

In another embodiment of the present invention, the first communication module 11 may also access the remote server 20 over a local area network to establish the first communication channel. In this case, the first communication module 11 comprises a local area network interface, for example, a Universal Serial Bus (USB) interface, a Bluetooth interface, or a Eth-Trunk interface, wherein the local area network interface is configured to access the remote access server 20 over a local area network.

In an embodiment of the present invention, the second communication module 12 comprises a modem, wherein the modem accesses the second service provider system 40 in such mobile communication modes as GSM, GPRS, EDGE, CDMA, EVDO, UMTS, LTE, WiFi, or satellite communication, or accesses the second service provider system 40 over such fixed networks as an ADSL network and a cable network. A corresponding model may be selected according to a network access mode supported by the multi-channel communication terminal 10.

In a preferred embodiment of the present invention, the multi-channel communication terminal 10 may comprise a channel sharing interface 14, configured to share the second communication channel to other devices.

The channel sharing interface 14 may be a USB interface, a Bluetooth interface, a WiFi interface, or an NEC interface.

Figure 2:
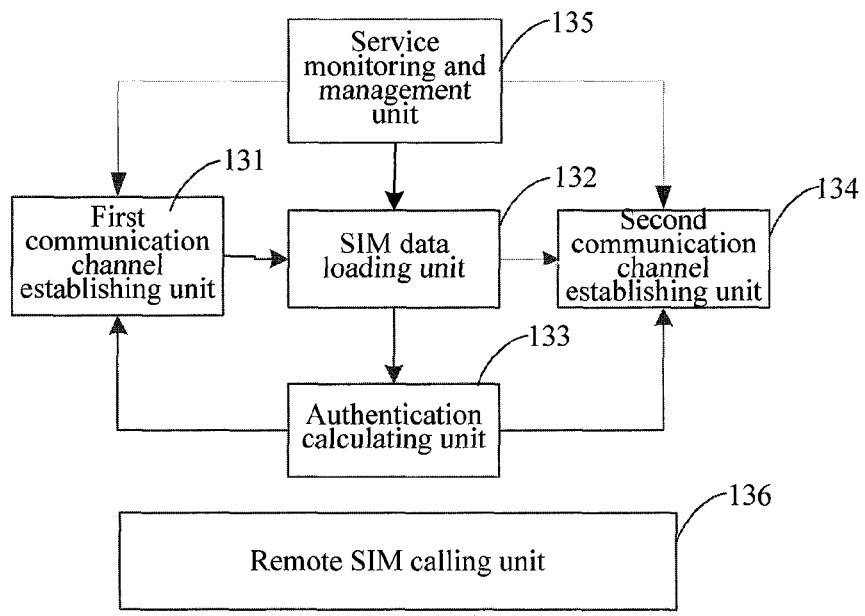
FIG. 2 is a schematic structural diagram of a communication system according to an embodiment of the present invention.

FIG. 2 is a schematic structural view of a communication management unit according to an embodiment of the present invention. For ease of description, only elements or parts relevant to this embodiment are illustrated. The communication management unit comprises: a first communication channel establishing unit 131, a SIM data loading unit 132, an authentication calculating unit 133, a second communication channel establishing unit 134.

The first communication channel establishing unit 131 is configured to communicate with the first service provider system 30 using the first communication module 11, and establish the first communication channel. Specifically, the first communication channel establishing unit 131 communicates, according to such local subscriber identity information as a SIM card, with the first service provider system 30 using the first communication module 11, and establishes the first communication channel.

The SIM data loading unit 132 is configured to send a service request to the remote server 20 over the first communication channel, and acquire the subscriber identity information assigned by the remote server 20.

In an embodiment of the present invention, the service request sent by the SIM data loading unit 132 to the remote server 20 comprises the location of the multi-channel communication terminal 10 and a requested service type, for example, a voice service, a data service, a video service, or the like.

The authentication calculating unit 133 communicates, over the first communication channel, with the second service provider system 40 and the remote server 20, and acquires an authentication result.

When the multi-channel communication terminal communicates with the service provider system via the SIM card inserted therein, the authentication calculating unit 133 logs in to, using the subscriber identity information assigned by the remote server 20, the second service provider system 40, and receives an authentication request returned by the second service provider system 40, wherein the authentication request comprises such authentication data packet, which needs to be calculated by the SIM card, as containing random numbers and authentication keys.

The authentication calculating unit 133 sends the authentication data packet that needs to be calculated by the SIM card to the remote server 20. The remote server 20 controls the corresponding SIM card to perform authentication calculation, and returns the calculated authentication result to the authentication calculating unit 133.

The second communication channel establishing unit 134 communicates, using the assigned subscriber identity information and the authentication result and using the second communication module 12, with the second service provider system 40, and establish the second communication channel to acquire a service provided by the second service provider system 40. Preferably, the second communication channel establishing unit 134 may also share, over the sharing interface 14, the second communication channel to other devices.

In an embodiment of the present invention, the communication management unit may further comprise a service monitoring and management unit 135. The service monitoring and management unit 135 implements service establishment, exchange, and disabling in the first communication channel and the second communication channel, and records such service usage details as data traffic, call duration, and video size to provide a basis for charging for the subscriber and the remote server 20.

The remote server 20 automatically implements charging, settlement and accounting for SIM card sharing according to the usage details.

In a preferred embodiment of the present invention, a local SIM card may be called by the remote server 20 such that the multi-channel communication terminal 10 may share a local SIM card to other subscribers.

When the remote server 20 calls the SIM card inserted on the multi-channel communication terminal 10, the remote SIM calling unit 136 returns the authentication result to the remote server 20, and implements sharing of the local SIM card.

The remote SIM calling unit 136 simulates a read-and-write process of the physical SIM card. When other devices call, using the remote server 20, the service of the physical SIM card shared by the device, the corresponding authentication result is returned to the remote server 20 over the first communication channel, thereby implementing remote call of the SIM card.

The service of the physical SIM card shared by the multi-channel communication terminal 10 is implemented by pre-uploading the local physical SIM card information, IP address, and the type of the shared service to the remote server 20 and scheduling the remote server 20 to register the local SIM card information as a SIM card subscribing for a service provided by the corresponding service provider system.

The remote SIM calling unit 136 enables the multi-channel communication terminal 10 to further share the service corresponding to the current subscriber identity information to other devices in any communication mode, for example, sharing data and voice service of the physical SIM card of the multi-channel communication terminal 10.

Once the physical SIM card is inserted into the multi-channel communication terminal 10, the SIM card may be scheduled by the remote server 20. When other subscribers schedule the SIM card using the remote server 20, the subscribers may acquire services of the SIM card within a time period, thereby implementing sharing of the service corresponding to the SIM card.

The physical SIM card is not subject to countries and service providers. All the physical SIM card information and such relevant service information as package and tariff are uniformly managed, scheduled and assigned by the remote server 20. The remote server 20 may acquire a sharing setting request, including geographic location, service type, price, time period, and sharing target (specified subscriber), from an individual or a group using a client on a personal computer, a smartphone, a tablet computer, and a multi-channel communication terminal 10.

In conclusion, according to the embodiments of the present invention, the multi-channel communication terminal 10 is a communication device supporting a plurality of communication channels, which may support one or a plurality of SIM cards, dynamic loading of the SIM data, and remote SIM call, and may share such services as data services and voice services to other communication devices using USB, WiFi, Bluetooth, and NFC.

The multi-channel communication terminal 10 comprises at least two communication modules, which may be a mobile communication modem supporting such communication modes as GSM, GPRS, EDGE, CDMA, EVDO, UMTS, LTE, WiFi, and satellite communication, or may be a fixed communication modem supporting such fixed communication networks as an ADSL network or a cable network.

The multi-channel communication terminal 10 supports establishment of a first communication channel using an inserted physical SIM card or other identity authentication manners and over a corresponding communication channel. One or a plurality of pieces of SIM data or other subscriber identity information that are assigned by the remote server 20 or a device supporting the remote SIM card may be acquired over the first communication channel, and a second communication channel corresponding to a service function of the SIM card or other subscriber identity information is established based on multi-channel capabilities of the multi-channel communication terminal.

In an embodiment of the present invention, the multi-channel communication terminal 10 uses an inserted SIM card of set SIM data as a node of the remote server 20, wherein the node may be called by other multi-channel communication terminals.

In an embodiment of the present invention, the multi-channel communication terminal may also share the service of any channel to other devices using USB, Bluetooth, WiFi, and NFC.

In the embodiments of the present invention, the multi-channel communication terminal 10 may be such a smart multi-channel communication terminal as a MiFi device (serving as mobile WiFi hotspots), a USB data card, a mobile phone, a Pad, an M2M, or may be a built-in module of any of these smart multi-channel communication terminals.

The multi-channel communication terminal 10 automatically carries out, using a connection management system, establishment of multiple channels, SIM data loading, data transfer, channel disabling, traffic monitoring, and the like according to subscriber usage scenario and network environment of a device, thereby implementing various international, any-service provider, and any-communication mode services, and individual SIM services, especially data services/broadband roaming services, sharing service, exchange services, and transaction services.

According to the above-described embodiment, a communication terminal acquires appropriate SIM data or subscriber identity information according to actual requirements, and communicates with a service provider system corresponding to the SIM data or the subscriber identity information to acquire a service provided by the service provider system, thereby acquiring an international, any-service provider, any-technology and mode, or any-service network access service.

Figure 3:
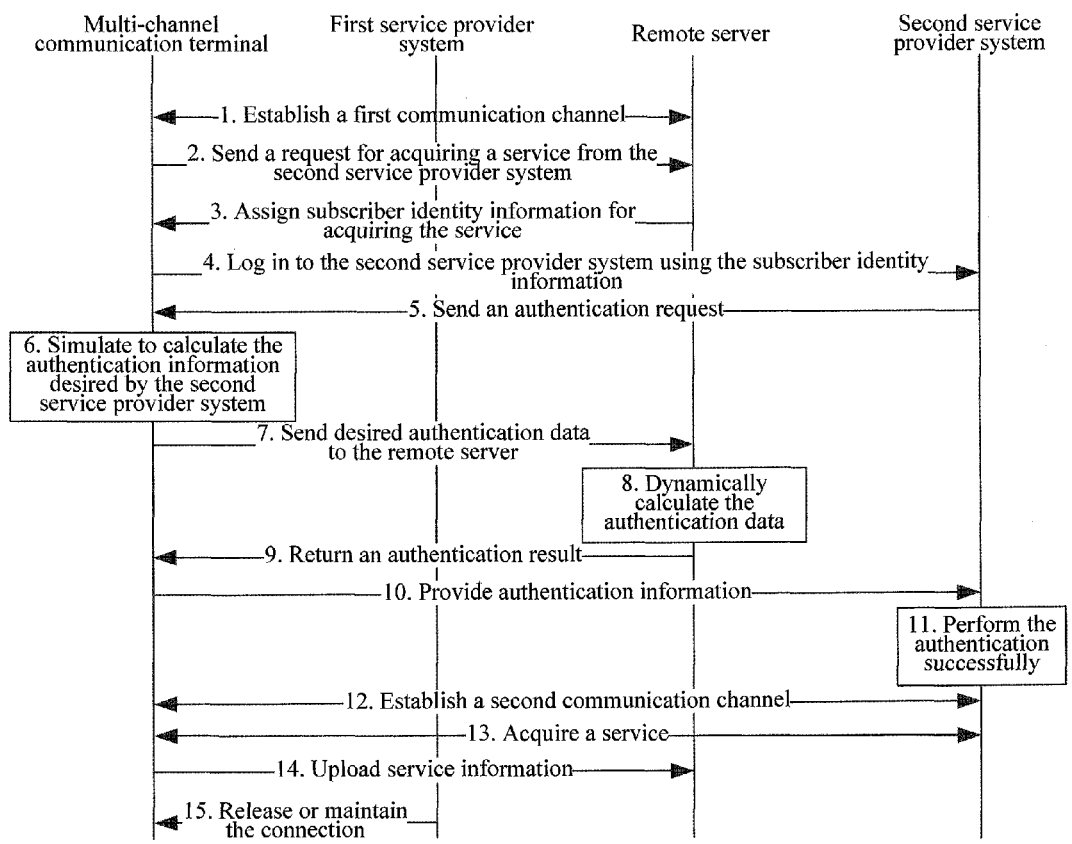
FIG. 3 is a flowchart of an application scenario of the multi-channel communication terminal illustrated in FIG. 1 and FIG. 2.

FIG. 3 illustrates an application scenario of a multi-channel communication terminal according to an embodiment of the present invention.

1. The multi-channel communication terminal is connected to the first service provider system according to currently supported subscriber identity information, and acquires a network access service provided by the first service provider system, and establishes the first communication channel with the remote server.

2. The multi-channel communication terminal communicates with the remote server over the first communication channel, sends a request for acquiring a service from the second service provider system, wherein the request comprises current location of the subscriber, a requested service type, and the like.

3. The remote server assigns subscriber identity information for acquiring the service provided by the second service provider system to the multi-channel communication terminal.

4. The multi-channel communication terminal logs in to the second service provider system using the subscriber identity information assigned by the remote server.

5. The second service provider system sends an authentication request to the multi-channel communication terminal, requesting the multi-channel communication terminal to provide subscriber authentication information.

6. The multi-channel communication terminal simulates to calculate the authentication information desired by the second service provider system.

7. The multi-channel communication terminal sends desired authentication data to the remote server.

8. The remote server dynamically calculates the authentication data, wherein the authentication data comprises random numbers, authentication keys, and the like.

9. The remote server returns a authentication result desired by the second service provider to the multi-channel communication terminal.

10. The multi-channel communication terminal provides authentication information for the second service provider system.

11. The second service provider system performs the authentication successfully.

12. The multi-channel communication terminal establishes a second communication channel with the second service provider system.

13. The multi-channel communication terminal acquires, over the second communication channel, a service provided by the second service provider system.

14. The multi-channel communication terminal uploads, over the first communication channel, service information to the remote server.

15. The multi-channel communication terminal releases or maintains the connection with the first service provider system according to actual requirements.

In another embodiment of the present invention, the subscriber may also share the SIM data or other subscriber identity information to other subscribers.

Firstly, the subscriber inserts a SIM card of a public network channel to be established and a SIM card for service sharing simultaneously in the multi-channel communication terminal.

The multi-channel communication terminal automatically selects, according to the inserted SIM cards or other set authentication modes, an appropriate access channel, and establish a data channel for communication and collaboration with the remote server.

The subscriber may set attributes of the SIM card to be shared, for example, a time period for sharing, traffic package, and the like. The multi-channel communication terminal automatically registers a local public network IP address (a static IP address and a dynamic IP address are both supported) to the remote server, such that the SIM card to be shared becomes a distributed SIM node in the remote server.

The remote server schedules, according to a sharing transaction policy set by the subscriber, all services of the SIM node to other user terminals desiring the services in a matching manner, thereby implementing sharing and transaction of the SIM service.

The multi-channel communication terminal according to the embodiments of the present invention may serve as a special wireless router, or may serve as a common USB data card, a MiFi device, and the like, wherein the multi-channel communication terminal is capable of establishing a wide area network interconnection between at least two wireless channels (for example, 2G, 3G, WiFi, and Bluetooth networks), or establishing a local area network interconnection between two of WiFi, Bluetooth, and NFC-capable networks.

According to the embodiments of the present invention, a subscriber acquires appropriate subscriber identity information according to actual requirements, and communicates with a corresponding service provider system according to the subscriber identity information to acquire a service provided by the service provider system, thereby acquiring an international, any-network, any-service provider, any-technology and mode, or any-service network access service.

Persons of ordinary skill in the art may understand that all or part of the steps of the methods in the embodiments may be implemented by a program instructing relevant hardware. The program may be stored in a non-transitory computer readable storage medium and may be executed by at least one processor. When the program runs, the steps of the methods in the embodiments are performed. The storage medium may be any medium capable of storing program codes, such as read-only memory (ROM), a random access memory (RAM), a magnetic disk, or a compact disc-read only memory (CD-ROM).

The above descriptions are merely preferred embodiments of the present invention, but are not intended to limit the present invention. Any modification, equivalent replacement, or improvement made without departing from the spirit and principle of the present invention should fall within the protection scope of the present invention.

What is claimed is:

1. A multi-channel communication terminal, the multi-channel communication terminal supporting at least two communication channels; wherein
the first communication channel is established by a first service provider system, and configured to acquire subscriber identity information assigned by a remote server and providing service sharing; and
the second communication channel is established by a second service provider system according to the subscriber identity information, and configured to acquire a service provided by the second service provider system;
the multi-channel communication terminal further comprises:
a first communication module;
a second communication module; and
a communication management unit, configured to: dynamically load, using the first communication module and over the first communication channel, the subscriber identity information assigned by the remote server; and acquire, using the second communication module and over the second communication channel, a service provided by the second service provider system;
the communication management unit comprises:
a first communication channel establishing unit, configured to communicate with the first service provider system using the first communication module, and establish the first communication channel;
a SIM data loading unit, configured to send a service request to the remote server over the first communication channel, and acquire the subscriber identity information assigned by the remote server;
an authentication calculating unit, configured to communicate, over the first communication channel, with the second service provider system and the remote server, and acquire an authentication result according to authentication request from the second service provider system, wherein, the authentication request comprises authentication data packet, which needs to be calculated by the SIM card, as containing random numbers and authentication keys; and
a second communication channel establishing unit, configured to communicate with the second service provider system according to the subscriber identity information and the authentication result, and establish the second communication channel;
wherein the service request comprises the location of the multi-channel communication terminal and a requested service type;
the first communication module comprises:
a modem, configured to access the remote server over a mobile communication network or a fixed network;
the first communication module further comprises:
at least one subscriber identity module (SIM) card slot; and a SIM card read-and-write chip connected to the SIM card slot;

wherein a SIM card is insertable into the SIM card slot;

the communication management unit further comprises:

a remote SIM calling unit, configured to: when other devices call the service of a local physical SIM card using the remote server, return the authentication result to the remote server, and implement sharing of the local physical SIM card.

2. The multi-channel communication terminal according to claim 1, wherein the first communication module comprises:

a local area network interface, configured to connect to the remote server over a local area network.

3. The multi-channel communication terminal according to claim 1, further comprising:

a channel sharing interface, configured to share the second communication channel to another device.

4. The multi-channel communication terminal according to claim 1, wherein the communication management unit further comprises:

a service monitoring and management unit, configured to implement service establishment, exchange, and disabling in the first communication channel and the second communication channel, and record service usage details to provide a basis for charging.

* * * * *